UNITED STATES PATENT OFFICE.

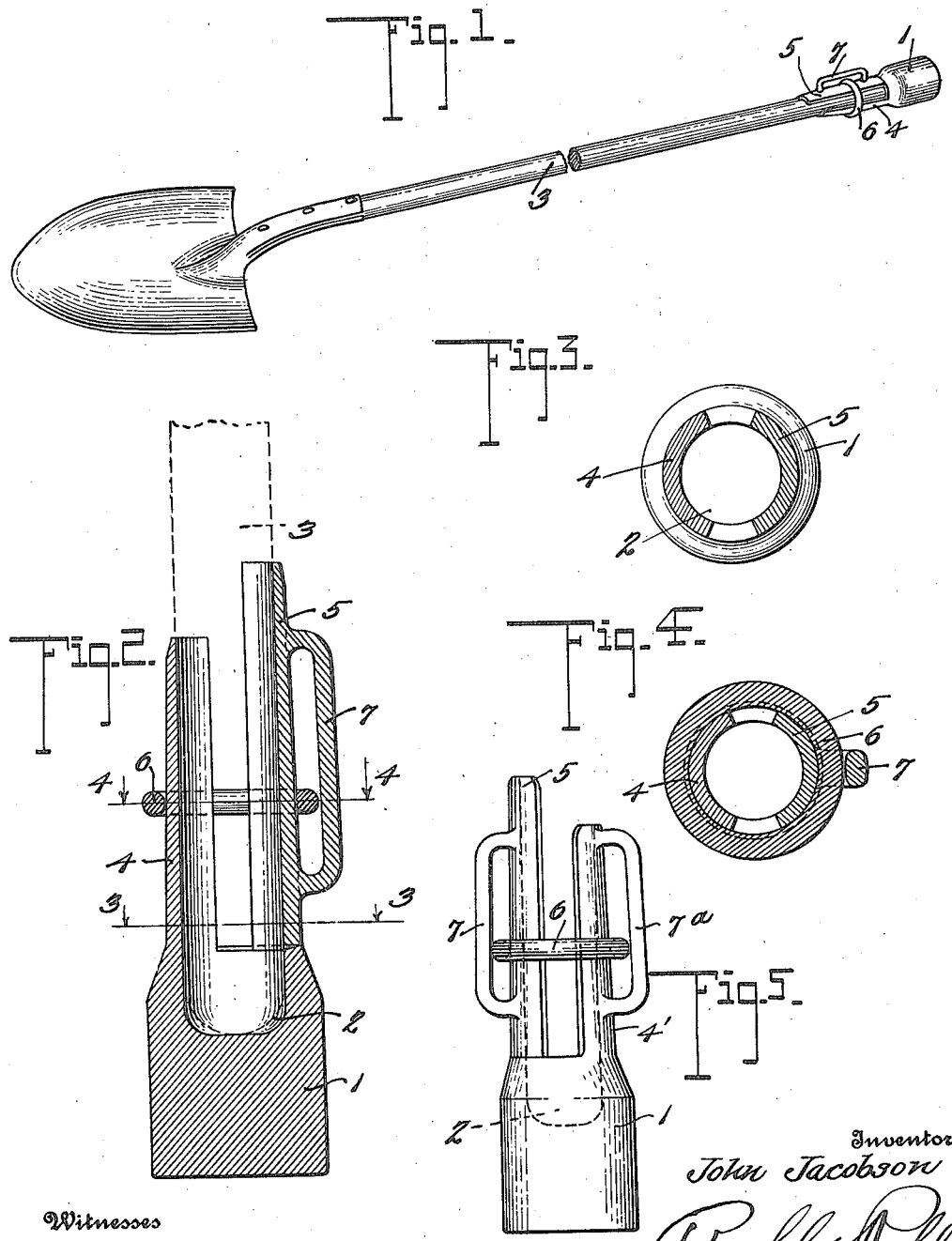

JOHN JACOBSON, OF ROBERTS, MONTANA.

TAMPING ATTACHMENT.

1,158,224.  Specification of Letters Patent.  Patented Oct. 26, 1915.

Application filed April 22, 1915. Serial No. 23,190.

*To all whom it may concern:*

Be it known that I, JOHN JACOBSON, a citizen of the United States, residing at Roberts, in the county of Carbon and State of Montana, have invented certain new and useful Improvements in Tamping Attachments, of which the following is a specification.

The object of the present invention is to provide a simple and efficient tamping attachment adapted to be connected to a shovel or other implement for tamping or packing earth, as in the setting of fence posts or the like. In the setting operations of this character, it is customary to use the end of a shovel handle to perform the tamping function or else employ a separate tamping device, but I have found it to be the most convenient to have an attachment of proper form and size for best accomplishing the result capable of being easily and quickly attached to the shovel extremity, the single tool or implement serving obviously a dual function.

To this end the attachment comprises merely a body formed to receive the shovel extremity, and clamping means coacting with said body to securely hold the same in position, the clamping action being enhanced in actual tamping operation.

With the above and other objects as may hereinafter appear in view, this invention consists in the construction, combination and arrangement of parts all as hereinafter more fully described and claimed.

Reference will now be had to the accompanying drawing forming a part of this specification, wherein:

Figure 1 is a perspective view of an implement having my attachment secured in position thereon. Fig. 2 is an enlarged vertical sectional view through the device. Fig. 3 is a sectional view on the line 3—3 of Fig. 2. Fig. 4 is a similar section on the line 4—4 of Fig. 2. Fig. 5 is an elevation of a device of a slightly modified form.

Throughout the following detail description, and on the several figures of the drawing, similar parts are referred to by like reference characters.

Specifically describing the invention and referring to the drawing, the numeral 1 designates the body portion of my tamping attachment, said body portion being of a suitable size and material for best carrying out the tamping operation for which it is adapted. I preferably employ a metallic body to obtain sufficient weight as desired, said body being formed with an interior socket 2 in which to receive the handle 3 of a shovel or similar implement. The body 1, as best shown by Fig. 2 is formed with an extension 4 at one end which is narrow and adapted to conform to the shape of the handle and furthermore decreases in thickness toward its extremity. Clamping means are employed for securing the body of the tamping member in position upon the handle 3 and such clamping means includes a wedge member or plate 5 shaped somewhat like the extension 4 and complemental thereto, the said plate tapering or narrowing in thickness toward its upper extremity also similar to the extension 4; the plate 5 preferably carries a clamping ring 6 which is interlocked on said plate by a keeper 7 projecting therefrom, the keeper being so formed as to allow a relative movement of the ring 6 along the plate.

It will readily be observed that to attach the tamping member or device forming the embodiment of this invention to an implement handle it is only necessary to insert the extremity of said handle in the socket 2 and dispose the clamping member 5 at the opposite side of said handle, sliding the ring 6 downwardly over the extension 4 of the body. By reason of the wedge-shape of the extension and the plate, the movement of the ring 6 downwardly will cause an adequate clamping action to take place so as to secure the device very rigidly to the handle extremity. It will be understood that I may either make the extension 4 or the plate 5 or both of the tapering form to accomplish this particular wedging action. It will be apparent that this special form of attaching means enables the device to be secured to handles of different sizes. The keeper 7 prevents misplacement of the ring and it will also be observed by reference to Fig. 2 that the lower extremity of the plate 5 and the abutting edge of the body 1 are oppositely beveled and this tends to increase the clamping action as the ring 6 is moved downwardly drawing the plate 5 into closer contact with the handle member and the plate is actuated or jarred during tamping operation.

In Fig. 5 I have shown a slightly modified form wherein the body 1 comprises the integral extension 4' having formed thereon a keeper 7ª in which is mounted the clamping ring 6. The coöperating clamping member 5 corresponding to the equivalent clamping member disclosed in the preferred form, having the keeper 7 in which the ring 6 is also interlocked. The advantage of this construction is that the movable clamping members are always connected with the body member and are, therefore, not likely to become lost. The clamping function is quite the same.

Having thus described my invention, what I claim as new is:

1. A tamping attachment comprising a body formed to receive an operating handle and arranged to extend on one side thereof, a detachable plate adapted to be disposed on the opposite side of the handle, and a clamping member surrounding the body and the plate and having interlocking connection with the latter whereby to hold said body on the handle.

2. A tamping attachment comprising a body adapted to be disposed on a handle extremity and having an extension arranged at one side of the handle, a wedge plate disposed on the opposite side of the handle to the extension aforesaid, and clamping means carried by said plate and movable over the extension for clamping the attachment in position on the handle.

3. A tamping attachment comprising a body adapted to be disposed on a handle extremity and having a tapering extension arranged at one side of the handle, a coöperating member arranged at the other side of said handle, clamping means connected to the coöperating member, and retaining means for said clamping means.

4. A tamping attachment comprising a body adapted to be disposed on a handle extremity and to engage the same at one side, and clamping means for said body comprising a wedge plate engaging the handle at the other side and a ring movably carried by the plate and adapted to engage with the body for clamping the handle between the plate and the body.

5. As a new article of manufacture, a tamping attachment adapted to be secured to a handle and comprising a body member formed with a handle receiving socket and an extension of wedge-shape construction, and clamping means adapted to coact with said body and extension and consisting of a plate for coöperation with the handle at the opposite side to the body extension aforesaid, and a ring interlocked with said plate and movable over the extension, said plate having a lateral keeper for retaining the ring in position on the plate.

In testimony whereof I affix my signature in presence of two witnesses.

JOHN JACOBSON.

Witnesses:
J. V. KACHELHOFFER,
ELBERT HYMER.